US007942031B2

(12) United States Patent
Tranquilli et al.

(10) Patent No.: US 7,942,031 B2
(45) Date of Patent: May 17, 2011

(54) SENSOR MOUNT ASSEMBLY

(75) Inventors: Nicholas A. Tranquilli, Henderson, NV (US); Paul Sarkisian, Boulder City, NV (US); Uwe Rockenfeller, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 12/048,054

(22) Filed: Mar. 13, 2008

(65) Prior Publication Data

US 2009/0230278 A1 Sep. 17, 2009

(51) Int. Cl.
*G01M 7/00* (2006.01)

(52) U.S. Cl. .......................................................... 73/12.01

(58) Field of Classification Search .................. 73/12.01
See application file for complete search history.

(56) References Cited

U.S. PATENT DOCUMENTS 3,666,134 A * 5/1972 Rauch ........................... 220/324
4,354,720 A * 10/1982 Bakermans ................... 439/357
4,408,490 A * 10/1983 Takahashi et al. .............. 73/497
4,532,414 A * 7/1985 Shah et al. .................... 392/470
5,114,060 A * 5/1992 Boyer ........................... 224/413
5,212,354 A * 5/1993 Miller et al. .................. 181/108
5,317,108 A * 5/1994 Prairie, Jr. ....................... 174/67
5,397,875 A * 3/1995 Bechtold, Jr. ................. 219/521
5,531,098 A * 7/1996 Bybee .......................... 73/35.17
5,756,972 A * 5/1998 Vranicar et al. .............. 219/541
6,154,360 A * 11/2000 Kaczeus et al. .......... 361/679.34
6,797,878 B1 * 9/2004 Radelet ........................... 174/50
6,832,572 B2 * 12/2004 Rodriquez et al. ............ 114/312
7,181,038 B2 * 2/2007 Rivera et al. .................. 381/396
7,351,386 B2 * 4/2008 Halstead et al. .............. 422/261
7,696,711 B2 * 4/2010 Pollack et al. ................ 318/466

* cited by examiner

*Primary Examiner* — Lisa M Caputo
*Assistant Examiner* — Octavia Davis
(74) *Attorney, Agent, or Firm* — Knobbe, Martens, Olson and Bear LLP

(57) ABSTRACT

A shock resistant sensor assembly comprises a base plate, a clamp lid, a hinge assembly secured to the base plate and the clamp lid and forming a hinge connection, and a releasable clamp assembly secured to either the base plate or the clamp lid opposite the hinge assembly and having a latch member for releasably engaging and clamping the other end of the base plate or the clamp lid. A sensor housing with a sensor is clamped between the base plate and the clamp lid.

31 Claims, 2 Drawing Sheets

SENSOR MOUNT ASSEMBLY

BACKGROUND OF THE INVENTION

Sensing devices or sensors used for the detection of fire, smoke and heat as well as detecting environmental gas levels, for example, carbon dioxide or carbon monoxide, are often used in special applications which require shock and vibration resistance. For example, in military uses, such as on shipboard or in aircraft and combat vehicles, such sensors need to be able to withstand substantial shock and vibration to which they are exposed. Current designs for ruggedized sensors include a cage or basket mounted near the sensor heads to capture and retain sensor components which may become separated during exposure to extreme vibrations and shock, such as explosions and the like. However, such a device does not adequately protect the sensor when exposed to such extreme conditions.

SUMMARY OF THE INVENTION

The present device is directed to a shock and vibration resistant sensor mount employing a pre-stressed hinge clamping assembly in which the sensor is mounted. A hinge assembly forms a hinge connection between a base plate and a clamp lid. A releasable clamp assembly, secured to the base plate and the clamp lid opposite the hinge assembly, provides for securely clamping the sensor housing and sensor between the base plate and the clamp lid. In a preferred embodiment, an elastomeric pad is compressed between the clamp lid and the sensor housing when the mounting assembly is engaged to clamp the sensor housing. Preferably, the clamp assembly is a latch-type toggle clamp. In another preferred embodiment, the base plate is unreleasably or permanently attached to the sensor support housing structure.

BRIEF DESCRIPTION OF THE DRAWINGS

FIG. 1 shows a two-hinge assembly and FIG. 2 a single hinge assembly.

DETAILED DESCRIPTION OF PREFERRED EMBODIMENTS

Figure 1:
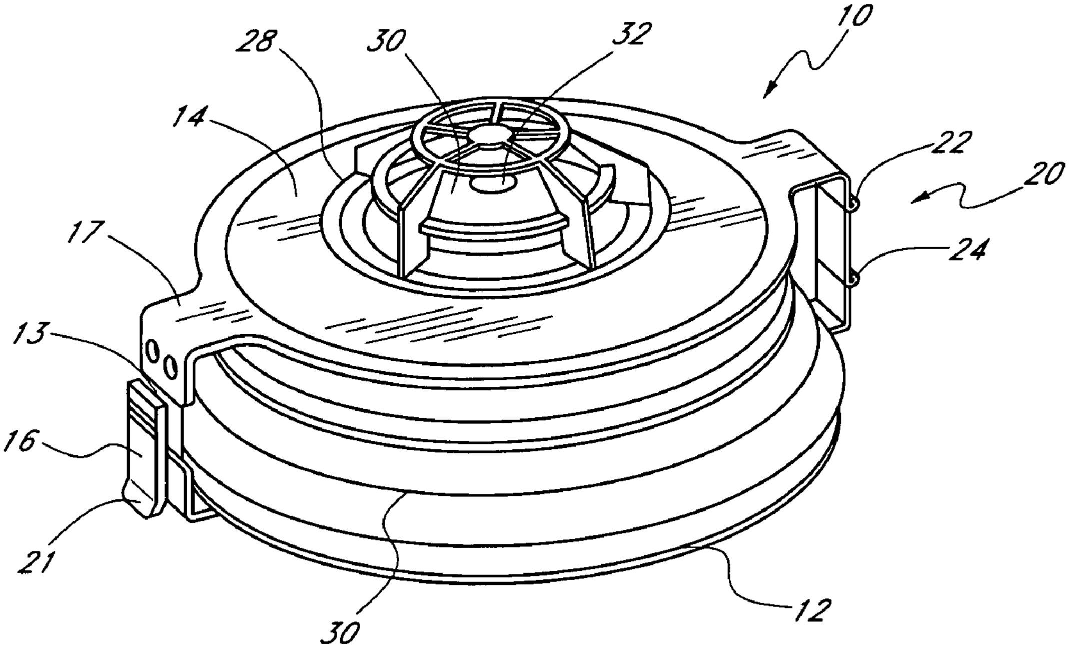
FIGS. 1 and 2 are isometric views showing the sensor mount assembly with sensor and sensor housing clamped therein.

Referring to the drawings, there is shown a sensor mount assembly 10 with a sensor 30 and sensor housing structure 26 clamped between base plate 12 and clamp lid (top restraint plate) 14. At one side of the assembly is the hinge assembly 20 which is secured to and between clamp lid 14 and base plate 12. Opposite the hinge assembly 20 is a releasable clamp assembly 25.

Figure 3:
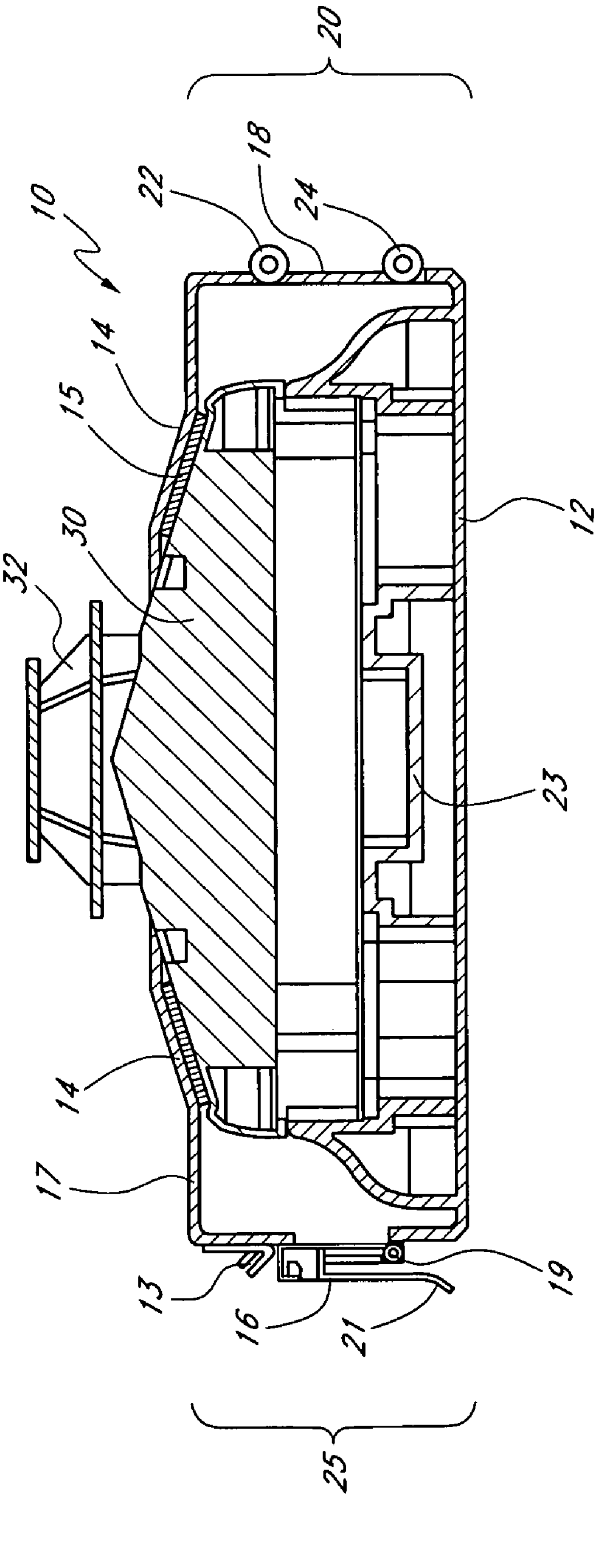
FIG. 3 is a side sectional elevation of the apparatus illustrated in FIG. 1.

The clamp lid 14 comprises a cover plate having a shape configured to exert force against the upper surface of a sensor or sensor housing as shown in the drawings. Preferably at least a portion of the clamp lid is shaped to conform to the shape of the sensor or sensor housing surface against which the clamp lid is forced. Such a configuration is seen in FIG. 3 in which a portion of the clamp lid 14 is sloped to conform to the slope and shape of the upper surface of the sensor 30. The clamp lid is also provided with an opening or port 28 through which the sensor is exposed. Accordingly, the clamp lid shown is configured as a slanted circular plate with a large opening in the center, with extensions at opposite sides of the plate. Other lid designs and shapes may be used so long as the clamp lid is capable of achieving the intended clamping functions in cooperation with the base plate in the manner described.

The base plate is preferably a circular configured to engage the bottom of the sensor housing structure opposite the clamp lid. The base plate is preferably generally flat but also may be provided with features such as ribs, ridges, grooves or channels for engaging, supporting and/or being secured to the sensor housing structure. The base plate is also provided with extensions at opposite positions for being secured to the hinge assembly and clamping assembly, respectively, as shown in the drawings. Other base plate shapes or designs may be used so long as there is necessary and intended cooperation with the other sensor mount assembly components as described.

Figure 2:
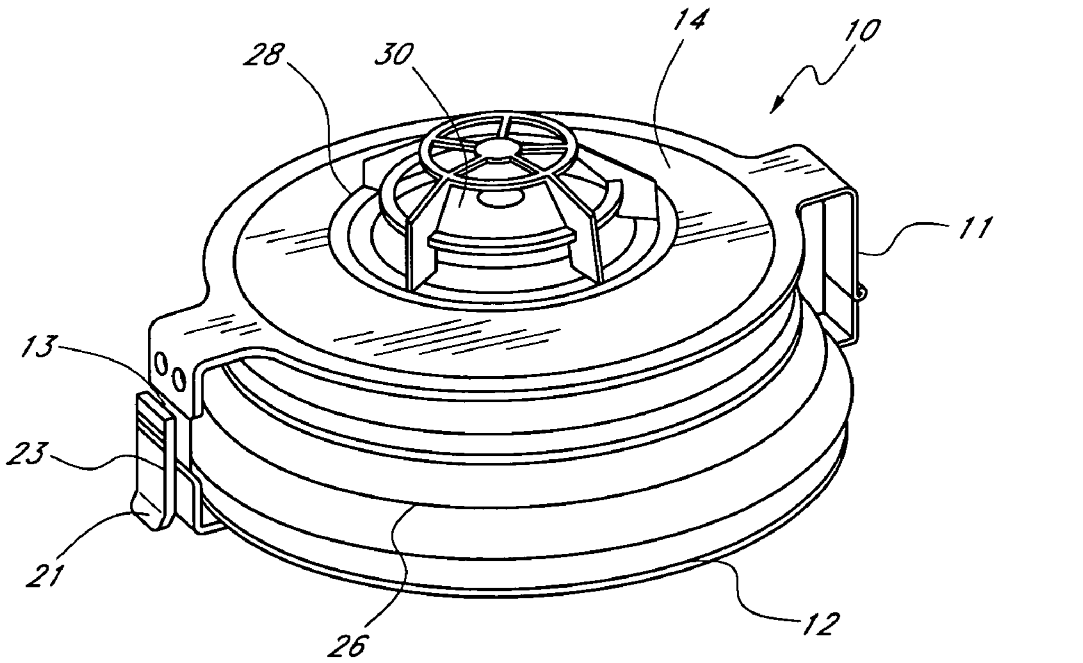

In the embodiments shown in FIGS. 1 and 3, hinge assembly 20 comprises two hinges 22 and 24 in series separated by hinge leaf 18. In FIG. 2, a single point hinge is shown. The advantage of the two point or double hinge shown in FIGS. 1 and 3 is the angle at which clamp lid 14 engages the sensor housing to provide more parallel engagement of the clamping members as compared to that provided by the single point hinge. In both hinge assembly types, the base plate is permanently secured to the hinge assembly as is the clamp lid. The base plate and/or clamp lid may be configured to include a 90° end leaf secured to a hinge in the manner illustrated. Other equivalent configurations and designs achieving the same function may be used as will be understood by those skilled in the art.

Opposite the hinge assembly 20 is a clamp assembly 25 for securing and forcing the base plate and clamp lid in clamping engagement against the sensor and sensor housing. The clamp assembly illustrated is a latch-type toggle clamp 16 which includes a toggle lever 21 and a U-shaped clamp 23 member which engages a lip 13 formed at the end of clamp lid or which is secured to an extension 17 of clamp lid 14. Clamp body 16 is secured to the base plate 12 at hinge 19. Such a latch-type toggle clamp, its components and operation are well known to those skilled in the art. However, other types of clamps and clamp assemblies may be used instead. Any such clamp assembly design configured to releasably connect the base plate and clamp lid in clamping engagement with a sensor and sensor housing may be used.

In a preferred embodiment shown in FIG. 3, an elastomer pad 15 is used between the clamp lid and sensor housing, preferably positioned on the underside of the clamp lid so that it can forceably engage the upper sensor housing surface to be compressed between the sensor housing surface and the clamp lid. The elastomer pad is preferably a flat, donut-shaped pad secured around the perimeter of the opening in the center of the clamp lid exposing the sensor head. Examples of suitable elastomer pad materials include silicone rubber, natural rubber, neoprene, EPR, EPDM, fluoroelastomers (Viton™), SBR, etc. ABR (polyacrylic rubber) resists hot oils and solvents whereas fluoroelastomers (FPM) have excellent solvent and chemical resistance, as well as continuous use at temperatures as high as 400° F. Preferably, the clastomeric pad is donut-shaped, leaving the sensor exposed through a large opening at the top of the clamp lid.

As also illustrated, particularly in FIG. 3, the base plate 12 may be secured to the bottom of the sensor housing structure 26. Such secure assembly includes attaching the base plate to the sensor housing using screws, rivets, welds, adhesive, and other suitable means, where it is intended that the sensor mount assembly is not to be separated from the sensor housing.

The clamping force exerted against the sensor housing by the closed clamp of the base plate and the clamp lid is in a range of between about 10 pounds and about 250 pounds, preferably between about 20 pounds and about 200 pounds, and most preferably between about 50 pounds and about 150 pounds. Again, it is preferred to use a two point hinge assembly to best create the clamp force uniformly between the two mount assembly clamp components.

The preferred materials of which the sensor mount assembly components are fabricated include plastics of suitable strength, capable of exerting and maintaining such clamp force configurations, all grades of aluminum, carbon steel and stainless steel also being preferred.

The shock resistant sensor assembly described hereinabove may be used not only with traditional temperature, smoke, and fire sensing devices, but may also be used for mounting cameras, electronic equipment, and other sensing components and devices which operation may be compromised when exposed to shock and vibration.

What is claimed is:

1. A sensor mount assembly comprising:

a base plate;

a clamp lid comprising an enlarged opening through which a sensor can be physically exposed to the outside of said assembly;

a hinge assembly secured to said base plate and said clamp lid and forming a hinge connection therewith;

a releasable clamp assembly secured to either said base plate or said clamp lid opposite said hinge assembly and having a latch member for releasably engaging and clamping the other of said base plate or said clamp lid and wherein said assembly is configured to physically expose a sensor through the enlarged opening in the clamp lid to the outside of the assembly when said clamp lid and said base plate are clamped together in an operating configuration; and an elastomeric pad secured along the underside of said clamp lid.

2. An assembly of claim 1 wherein said releasable clamp assembly comprises a latch type toggle clamp.

3. An assembly of claim 1 wherein said hinge assembly comprises a plurality of hinges in series.

4. An assembly of claim 1 wherein said hinge assembly comprises two hinges in series.

5. An assembly of claim 1 wherein said hinge assembly comprises a single hinge.

6. An assembly of claim 1 wherein said releasable clamp assembly is secured to said base plate.

7. An assembly of claim 1 further including a sensor comprising a sensor housing and a sensor head mounted within said assembly with said sensor housing clamped therein between said base plate and said clamp lid.

8. An assembly of claim 7 wherein said clamp lid has a centrally located enlarged opening exposing said sensor head.

9. An assembly of claim 8 including an elastomeric pad compressed between said clamp lid and sensor housing.

10. An assembly of claim 9 wherein said elastomeric pad extends around the perimeter of said opening.

11. A shock resistant sensor assembly comprising:

a sensor housing having a sensor therein; and a mounting assembly comprising a base plate, a clamp lid comprising an enlarged opening through which said sensor is physically exposed, a hinge assembly secured to said base plate and said clamp lid and forming a hinge connection therebetween, a releasable clamp assembly secured to said base plate and said clamp lid opposite said hinge assembly, and an elastomeric pad between said sensor housing and said clamp lid, and wherein said releasable clamp assembly is engaged thereby clamping said sensor between said clamp lid and said base plate with said elastomeric pad compressed between said clamp lid and said sensor housing, and whereby said sensor housing and sensor are mounted and clamped in said mounting assembly between said base plate and said clamp lid with said sensor assembly in an operating configuration, and wherein said sensor is exposed to the external environment through the enlarged opening in the clamp lid when the sensor assembly is in said operating configuration.

12. An assembly of claim 11 wherein said clamp assembly comprises a latch type toggle clamp.

13. An assembly of claim 11 wherein said hinge assembly comprises a plurality of hinges in series.

14. An assembly of claim 11 wherein said hinge assembly comprises two hinges in series.

15. An assembly of claim 11 wherein said hinge assembly comprises a single hinge.

16. An assembly of claim 11 wherein said base plate is attached to said sensor housing.

17. An assembly of claim 11 wherein said base plate is attached to said sensor housing with screws.

18. An assembly of claim 11 wherein said base plate is welded or glued to said sensor housing.

19. An assembly of claim 11 wherein said sensor comprises a gas sensor.

20. An assembly of claim 11 wherein said sensor comprises a heat sensor.

21. An assembly of claim 11 wherein said sensor comprises a camera.

22. An assembly of claim 11 wherein said sensor housing is clamped in said mounting assembly at a clamping force of between about 10 pounds and about 250 pounds.

23. A sensor mount assembly comprising:

a base plate;

a clamp lid comprising an enlarged opening through which a sensor can be physically exposed to the outside of said assembly;

a hinge assembly secured to said base plate and said clamp lid and forming a hinge connection therewith;

a releasable clamp assembly secured to either said base plate or said clamp lid opposite said hinge assembly and having a latch member for releasably engaging and clamping the other of said base plate or said clamp lid and wherein said assembly is configured to physically expose a sensor through the enlarged opening in the clamp lid to the outside of the assembly when said clamp lid and said base plate are clamped together in an operating configuration; and a sensor comprising a sensor housing and a sensor head mounted within said assembly with said sensor housing clamped therein between said base plate and said clamp lid, and wherein said enlarged clamp lid opening is centrally located and exposing said sensor head.

24. An assembly of claim 23 wherein said releasable clamp assembly comprises a latch type toggle clamp.

25. An assembly of claim 23 wherein said hinge assembly comprises a plurality of hinges in series.

26. An assembly of claim 23 wherein said hinge assembly comprises two hinges in series.

27. An assembly of claim 23 wherein said hinge assembly comprises a single hinge.

28. An assembly of claim 23 including an elastomeric pad secured along the underside of said clamp lid.

29. An assembly of claim 23 wherein said releasable clamp assembly is secured to said base plate.

30. An assembly of claim 28 wherein said elastomeric pad is compressed between said clamp lid and sensor housing.

31. An assembly of claim 30 wherein said elastomeric pad extends around the perimeter of said opening.

* * * * *